United States Patent
Debeaux et al.

(10) Patent No.: US 11,795,535 B2
(45) Date of Patent: Oct. 24, 2023

(54) ALUMINUM-BASED COATING FOR FLAT STEEL PRODUCTS FOR PRESS MOLD HARDENING COMPONENTS, AND METHOD FOR PRODUCING SAME

(71) Applicant: Salzgitter Flachstahl GmbH, Salzgitter (DE)

(72) Inventors: Marc Debeaux, Hildesheim (DE); Friedrich Luther, Gehrden (DE); Thomas Koll, Braunschweig (DE)

(73) Assignee: Salzgitter Flachstahl GmbH, Salzgitter (DE)

( * ) Notice: Subject to any disclaimer, the term of this patent is extended or adjusted under 35 U.S.C. 154(b) by 63 days.

(21) Appl. No.: 17/420,344

(22) PCT Filed: Dec. 27, 2019

(86) PCT No.: PCT/EP2019/087067
§ 371 (c)(1),
(2) Date: Jul. 1, 2021

(87) PCT Pub. No.: WO2020/141147
PCT Pub. Date: Jul. 9, 2020

(65) Prior Publication Data
US 2022/0090250 A1  Mar. 24, 2022

(30) Foreign Application Priority Data
Jan. 4, 2019 (DE) .......................... 102019100140.4

(51) Int. Cl.
*C23C 2/12* (2006.01)
*C23C 2/28* (2006.01)
(Continued)

(52) U.S. Cl.
CPC .................. *C23C 2/12* (2013.01); *B32B 3/00* (2013.01); *B32B 15/012* (2013.01); *B32B 15/04* (2013.01);
(Continued)

(58) Field of Classification Search
CPC ....... C23C 28/321; C23C 28/345; C23C 2/12; C23C 2/20; C23C 2/26; C23C 2/28;
(Continued)

(56) References Cited

U.S. PATENT DOCUMENTS

2019/0040513 A1* 2/2019 Koll .................. C22C 21/02

FOREIGN PATENT DOCUMENTS

DE           69706387 T2    6/2002
DE       102004007071 B4    1/2006
(Continued)

OTHER PUBLICATIONS

Preliminary Report on Patentability of the International Searching Authority in English from corresponding Patent Cooperation Treaty (PCT) Application No. PCT/EP2019/087067, completed Jun. 16, 2021.
(Continued)

*Primary Examiner* — Michael E. La Villa
(74) *Attorney, Agent, or Firm* — Gardner, Linn, Burkhart & Ondersma LLP (57) ABSTRACT

An aluminum-based coating of a flat steel product is applied in a hot-dipping method and comprises a mass percentage of silicon within a given range. The coating for a flat steel product, in particular for press mold hardening components, offers a shortened required minimum oven dwell time and a sufficiently large processing window when heating in an oven. This is achieved in that the surface of the coating has a degree of absorption for thermal radiation ranging between 0.35 and 0.95 prior to an annealing treatment, where the
(Continued)

degree of absorption relates to an oven temperature ranging from 880 to 950° C. during the austenitizing annealing treatment. The invention additionally relates to an improved method for producing a flat steel product with an aluminum-based coating, to an inexpensive method for producing press-hardened components from such flat steel products, and to a press-hardened component made of such flat steel products.

21 Claims, 6 Drawing Sheets (51) Int. Cl.
| | |
|---|---|
| C23C 2/20 | (2006.01) |
| C21D 1/25 | (2006.01) |
| B32B 15/01 | (2006.01) |
| C22C 21/02 | (2006.01) |
| C21D 1/26 | (2006.01) |
| C25D 11/04 | (2006.01) |
| C23C 28/00 | (2006.01) |
| C23C 2/40 | (2006.01) |
| C23F 1/36 | (2006.01) |
| C23C 2/26 | (2006.01) |
| C21D 1/00 | (2006.01) |
| C25F 3/04 | (2006.01) |
| C25D 11/02 | (2006.01) |
| C23C 30/00 | (2006.01) |
| C21D 8/02 | (2006.01) |
| C21D 8/00 | (2006.01) |
| C22C 21/04 | (2006.01) |
| C23C 28/02 | (2006.01) |
| C21D 9/46 | (2006.01) |
| C21D 9/48 | (2006.01) |
| C21D 1/34 | (2006.01) |
| C21D 8/04 | (2006.01) |
| C23F 3/03 | (2006.01) |
| B32B 15/04 | (2006.01) |
| C23F 3/02 | (2006.01) |
| B32B 3/00 | (2006.01) |
| C25D 11/06 | (2006.01) |
| B32B 15/18 | (2006.01) |
| C25D 11/24 | (2006.01) |
| C25D 11/08 | (2006.01) |
| C25D 11/10 | (2006.01) |

(52) U.S. Cl.
CPC ............ *B32B 15/043* (2013.01); *B32B 15/18* (2013.01); *C21D 1/00* (2013.01); *C21D 1/25* (2013.01); *C21D 1/26* (2013.01); *C21D 1/34* (2013.01); *C21D 8/005* (2013.01); *C21D 8/0205* (2013.01); *C21D 8/0278* (2013.01); *C21D 8/0405* (2013.01); *C21D 9/46* (2013.01); *C21D 9/48* (2013.01); *C22C 21/02* (2013.01); *C22C 21/04* (2013.01); *C23C 2/20* (2013.01); *C23C 2/26* (2013.01); *C23C 2/261* (2022.08); *C23C 2/265* (2013.01); *C23C 2/28* (2013.01); *C23C 2/29* (2022.08); *C23C 2/40* (2013.01); *C23C 28/021* (2013.01); *C23C 28/321* (2013.01); *C23C 28/345* (2013.01); *C23C 30/00* (2013.01); *C23C 30/005* (2013.01); *C23F 1/36* (2013.01); *C23F 3/02* (2013.01); *C23F 3/03* (2013.01); *C25D 11/02* (2013.01); *C25D 11/026* (2013.01); *C25D 11/04* (2013.01); *C25D 11/06* (2013.01); *C25D 11/24* (2013.01); *C25F 3/04* (2013.01); *C21D 2211/001* (2013.01); *C21D 2211/008* (2013.01); *C25D 11/08* (2013.01); *C25D 11/10* (2013.01); *Y10T 428/1259* (2015.01); *Y10T 428/12458* (2015.01); *Y10T 428/12556* (2015.01); *Y10T 428/12569* (2015.01); *Y10T 428/12583* (2015.01); *Y10T 428/12611* (2015.01); *Y10T 428/12618* (2015.01); *Y10T 428/12736* (2015.01); *Y10T 428/12757* (2015.01); *Y10T 428/12764* (2015.01); *Y10T 428/12972* (2015.01); *Y10T 428/12993* (2015.01); *Y10T 428/2495* (2015.01); *Y10T 428/24967* (2015.01); *Y10T 428/24975* (2015.01); *Y10T 428/26* (2015.01); *Y10T 428/265* (2015.01); *Y10T 428/27* (2015.01); *Y10T 428/273* (2015.01)

(58) Field of Classification Search
CPC .......... C23C 2/40; C23C 2/265; C23C 2/261; C23C 30/00; C23C 30/005; C23C 2/29; C21D 1/00; C21D 1/25; C21D 1/26; C21D 1/34; C21D 2211/001; C21D 2211/008; C21D 9/46; C21D 9/48; C21D 8/005; C21D 8/0205; C21D 8/0278; C21D 8/0405; C22C 21/02; C22C 21/04; C23F 1/36; C23F 3/04; C23F 3/02; C23F 3/03; C25D 11/026; C25D 11/04; C25D 11/08; C25D 11/10; C25D 11/02; C25D 11/06; C25D 11/24; B32B 15/012; B32B 15/04; B32B 15/043; B32B 15/18; B32B 3/00; Y10T 428/12556; Y10T 428/12569; Y10T 428/12583; Y10T 428/1259; Y10T 428/12611; Y10T 428/12618; Y10T 428/12736; Y10T 428/12757; Y10T 428/12764; Y10T 428/12972; Y10T 428/12993; Y10T 428/12458; Y10T 428/24967; Y10T 428/24975; Y10T 428/2495; Y10T 428/26; Y10T 428/27; Y10T 428/273; Y10T 428/265
See application file for complete search history.

(56) References Cited

FOREIGN PATENT DOCUMENTS

| DE | 60119826 T2 | 12/2006 | |
|---|---|---|---|
| DE | 69933751 T2 | 10/2007 | |
| DE | 102009007909 A1 | 8/2010 | |
| DE | 102016102504 A1 | 8/2017 | |
| EP | 2449138 B1 | 3/2013 | |
| EP | 2828414 B1 | 8/2017 | |
| RU | 2466210 C2 | 11/2012 | |
| RU | 2539883 C2 | 1/2015 | |
| RU | 2621941 C2 | 6/2017 | |
| WO | 2009095427 A1 | 8/2009 | |
| WO | WO-2017137304 A1 * | 8/2017 | ............ C21D 1/673 |
| WO | 2018153755 A1 | 8/2018 | |

OTHER PUBLICATIONS

International Search Report and Written Opinion of the International Searching Authority from corresponding Patent Cooperation Treaty (PCT) Application No. PCT/EP2019/087067, indicated completed on Jan. 27, 2020.

* cited by examiner

ALUMINUM-BASED COATING FOR FLAT STEEL PRODUCTS FOR PRESS MOLD HARDENING COMPONENTS, AND METHOD FOR PRODUCING SAME

CROSS REFERENCE TO RELATED APPLICATION

The present application claims the priority benefits of International Patent Application No. PCT/EP2019/087067, filed Dec. 27, 2019, and claims benefit of German patent application no. DE 10 2019 100 140.4, filed on Jan. 4, 2019.

BACKGROUND AND FIELD OF THE INVENTION

The invention relates to an aluminum-based coating for flat steel products for press-form-hardening of components, wherein the coating comprises an aluminum-based coat which is applied in the hot-dipping method. The invention also relates to a method for producing a flat steel product comprising an aluminum-based coating, wherein an aluminum-based coat is applied as the coating onto the steel sheet or steel strip in the hot-dipping method. Furthermore, the invention relates to a method for producing press-hardened components consisting of flat steel products comprising an aluminum-based coating, which are produced according to the aforementioned method. In addition, the invention relates to a press-hardened component consisting of flat steel products comprising an aluminum-based coating, which are produced according to the aforementioned method. Hereinafter, flat steel products are understood to be in particular steel sheets or steel strips. Steel sheets for press-form-hardening are often also referred to as plates.

It is known that hot-formed steel sheets are being used with increasing frequency in particular in automotive engineering. By means of the process which is also defined as press-hardening or press-form-hardening, it is possible to produce high-strength components which are used predominantly in the region of the bodywork. Press-hardening can fundamentally be carried out by means of two different method variations, namely by means of the direct or indirect method. Whereas the process steps of forming and hardening are performed separately from one another in the indirect method, they take place together in one tool in the direct method. However, only the direct method will be considered hereinafter.

In the direct method, a steel sheet plate is heated above the so-called austenitization temperature (Ac3), the thus heated plate is then transferred to a forming tool and formed in a single-stage formation step to make the finished component and in this case is cooled by the cooled forming tool simultaneously at a rate above the critical cooling rate of the steel so that a hardened component is produced.

Known hot-formable steels for this area of application are e.g. the manganese-boron steel "22MnB5" and latterly also air-hardenable steels according to European patent EP 2 449 138 B1 or a low-scale heat-treatment steel according to European patent EP 2 828 414 B1.

In addition to uncoated steel sheets, steel sheets comprising scaling protection for press-hardening are also used in the automotive industry. The advantages here are that, in addition to the increased corrosion resistance of the finished component, the plates or components do not become scaled in the furnace, whereby wearing of the pressing tools by flaked-off scales is reduced and the components often do not have to undergo costly blasting prior to further processing.

Currently, the following (alloy) coats which are applied by hot-dipping are known for press-hardening: aluminum-silicon (AS), zinc-aluminum (Z), zinc-aluminum-iron (ZF/galvannealed), zinc-magnesium-aluminum (ZM) and electrolytically deposited coatings of zinc-nickel or zinc, wherein the latter is converted to an iron-zinc alloy layer prior to hot-forming. These corrosion protection coatings are conventionally applied to the hot or cold strip in continuous feed-through processes.

The production of components by means of quenching of pre-products consisting of press-hardenable steels by hot-forming in a forming tool is known from German patent DE 601 19 826 T2. In this case, a sheet plate previously heated above the austenitization temperature to 800-1200° C. and possibly provided with a metallic coat of zinc or on the basis of zinc is formed in an occasionally cooled tool by hot-forming to produce a component, wherein during forming, by reason of rapid heat extraction, the sheet or component in the forming tool undergoes quench-hardening (press-hardening) and obtains the required strength properties owing to the resulting martensitic hardness structure.

The production of components by means of quenching of pre-products which are coated with an aluminum alloy and consist of press-hardenable steels by hot-forming in a forming tool is also known from German patent DE 699 33 751 T2. In this case, a sheet which is coated with an aluminum alloy is heated to above 700° C. prior to forming, wherein an intermetallic alloyed compound on the basis of iron, aluminum and silicon is produced on the surface and subsequently the sheet is formed and is cooled at a rate above the critical cooling rate.

It is also already described in international laid-open document WO 2018/153 755 A1 to produce press-hardened components from steel sheets comprising an aluminum-based coat. For this purpose, the steel sheet is heated to austenitization temperature (Ac3), the thus heated steel sheet is then transferred to a forming tool and formed in a single-stage forming step to make the finished component. In this case, by means of the cooled forming tool the component is simultaneously cooled at a rate which is above the critical cooling rate of the steel sheet and so a hardened component is produced.

The advantage of the aluminum-based coats compared with the zinc-based coats resides in the fact that, in addition to a larger process window (e.g. in terms of the heating parameters), the finished components do not have to be subjected to blasting prior to further processing. Furthermore, in the case of aluminum-based coats there is no risk of liquid metal embrittlement and micro-cracks cannot form in the near-surface substrate region on the former austenite grain boundaries which, at depths greater than 10 μm, can have a negative effect on the fatigue strength.

However, one difficulty in using aluminum-based coats is that, during heating of a steel plate in the roller hearth furnace prior to hot-forming, the coat can react with the ceramic transport rollers consisting of sintered mullite or fused silica. The AlSi melt which becomes liquid during heating penetrates into the porous rollers and results in local density differences after solidification. As a result, the service life of the furnace rollers is significantly reduced.

Moreover, a disadvantage in the use of aluminum-based coats, e.g. consisting of aluminum-silicon (AlSi, AS), is the insufficient lacquer-bonding of the formed component in the cathodic dip coating (KTL), typical for automobiles, when a too short heating time has been used for press-hardening. At short heating times, the surface has a low level of roughness and so sufficient lacquer-bonding is not achieved.

In contrast to zinc-based coats, aluminum-based coats cannot phosphatise or cannot phosphatise sufficiently, and therefore no improvement in the lacquer-bonding can be achieved by the phosphatising step. For these reasons, up to now when processing plates with aluminum-based coats minimum heating times must be maintained, whereby the coat is thoroughly alloyed with iron and forms a rough surface topography which effects sufficient lacquer-bonding when lacquering the formed component.

However, thoroughly alloying the coat with iron and forming a lacquer-free surface topography require a correspondingly long dwell time in the typically used roller hearth furnace, thereby requiring longer furnaces for this coat than is the case e.g. for material without any scaling protection. Of course, it would also be feasible to reduce the transport speed of the plates in the furnace, but this would significantly impair the cycle time and thus also the economic viability of the press-form-hardening process. The minimum dwell time in the furnace is thus determined by the coat and not by the base material for which merely the austenite conversion would be required. Therefore, as already mentioned, for AS plates, adapted, longer furnaces are used to achieve high cycle rates despite the required furnace dwell time. However, these are more expensive to purchase and to operate and also require a very large amount of space.

In order to confront these problems, it is known, e.g. from the patent document DE 10 2004 007 071 B4, to shorten the process time of the flat products, which are provided with an AlSi coat, at the site of the processor by virtue of the fact that the thorough alloying of the coat and the heating of the flat steel product to forming temperature are performed in two separate working steps. This procedure is to allow the process of thorough alloying of the flat steel product, which is provided with the AlSi coat, to be performed at the site of the manufacturer. Then, at the site of the processor the heating of the flat steel product provided with the then already thoroughly alloyed coat can be effected e.g. by means of induction or conduction in an optimally short time, without having to take the formation of the coat into consideration. However, in the case of the proposal explained above it has proven to be problematic that the completely thoroughly alloyed coat itself is subjected to corrosive attack both during storage of the pre-produced flat steel products in the intermediate storage facility and also during the working steps performed at the site of the processor. This problem is apparent from the iron proportion which is present on the free surface of the thoroughly alloyed coat.

It is known from laid-open document WO 2009/095427 A1 to employ a method of press-form-hardening, in which a two-stage heat treatment takes place, wherein in a first heating step iron is only incompletely alloyed from the steel substrate into the AlSi coat. Subsequently, the steel product which is provided with the coat which in accordance with the invention is only incompletely thoroughly alloyed is to be cooled to room temperature and stored until it is directed to further processing to form the respective component. Since the AlSi coat is alloyed with iron only incompletely in the first heating step, the AlSi coat is to also have low corrosion susceptibility even after the first heating step and so its storage, transport and the further working steps performed in advance of the second heat treatment can be performed in a problem-free manner without requiring additional measures for this purpose.

Prior to being formed into a component, the flat product which is obtained after the first heating step and in accordance with the invention is provided with an only pre-alloyed coat is to be subjected to a second heating step, in which the complete thorough alloying with iron takes place. This second heating step is to be performed thereafter generally at the site of the final processor, whereas the first heat treatment step to be completed is to be performed generally at the site of the producer of the steel products.

However, in this case it is disadvantageous that the pre-alloying of the coat with iron from the base material reduces the extent of the process window during the second heating step, e.g. in a roller hearth furnace, at the site of the processor. In this context, the extent of the process window is understood to be the difference between the maximum permissible and minimum required furnace dwell time. Although, by reason of the pre-alloying of the coat with iron, the minimum furnace dwell time required for complete thorough alloying with iron becomes shorter, the maximum permissible furnace dwell time is also shortened considerably—there is not only a shift of the process window towards shorter times, but also a decrease in size. However, in the event of a malfunction at the press (e.g. during the transfer of a plate into the press or during removal of components from the press), which takes a certain amount of time to resolve, a large process window is important in order not to have to discard all of the plates located in advance thereof in the furnace, because when the maximum allowed furnace dwell time is exceeded, the further processing of the components, e.g. in terms of spot welding capability, is no longer provided. What is also disadvantageous in this method is the required, double heating step which considerably increases the total costs for producing the component.

A steel sheet comprising an aluminum-silicon coating which is used as a heat shield for exhaust pipes in motor vehicles is already known from German patent DE 697 06 387 T2. The aluminum-silicon coating applied using a hot-dipping method consists of an alloy on an aluminum basis which contains between 7 and 11 wt. % silicon and between 87 and 93 wt. % aluminum. For the coating, a spectral emissivity of below 0.15 is stated for all wavelengths between 1.5 and 15 μm.

Furthermore, German laid-open document DE 10 2016 102 504 A1 already describes a steel sheet or steel strip comprising an aluminum-based and silicon-containing hot-dip coat. In this case, the melting bath has an Si content of 8 to 12 wt. %, an Fe content of 1 to 4 wt. % and a remainder of aluminum. Arranged on this coat is a cover layer which contains aluminum oxide and/or aluminum hydroxide and which has been produced by anodic oxidation, plasma oxidation, hot water treatment at temperatures of at least 90° C. or a treatment in steam at temperatures of at least 90° C. The average layer thickness of the cover layer is less than 4 μm and greater than 0.05 μm.

SUMMARY OF THE INVENTION

The present invention provides an aluminum-based coating of a flat steel product, in particular for press-form-hardening of components, which, during heating in a furnace, offers shortened, minimum required furnace dwell times and a sufficiently large process window. Also, the flat steel product comprising the aluminum-based coating is to preferably have excellent suitability for press-form-hardening. Furthermore, an improved method for producing a flat steel product comprising an aluminum-based coating, a cost-effective method for producing press-hardened components consisting of such flat steel products and a press-hardened component consisting of such flat steel products are to be provided.

The present invention includes an aluminum-based coating of a flat steel product, wherein the coating has an aluminum-based coat which is applied in the hot-dipping method and has 1.8 to 15 mass percent silicon, advantageously 5 to 13 mass percent silicon, even more advantageously 8 to 11 mass percent silicon and the flat steel product coated in this manner is subjected to annealing treatment in an austenitizing manner in a furnace, characterised in that the surface of the coating has a degree of absorption for thermal radiation between 0.35 and 0.95 prior to the annealing treatment, wherein the degree of absorption is related to a furnace temperature in the range of 880 to 950° C. during the austenitizing annealing treatment. Both the silicon content and the degrees of absorption also relate to the state or the measurement prior to the austenitization.

With this structure of the coating, it is apparent that the surface of the coating is the surface of the coat. In connection with an austenitizing annealing treatment of the flat steel product, the coating serves as scaling protection. The flat steel product comprising the aluminum-based coating in accordance with the invention is particularly suitable for producing press-form-hardened components, wherein the flat steel product coated in this manner is subjected to an austenitizing annealing treatment prior to the press-form-hardening. Therefore, the degree of absorption of the coating relates to a state prior to the austenitizing annealing treatment and prior to the press-form-hardening.

In the context of the invention, the term "aluminum-based" is to be understood to mean a coating which contains aluminum as the main constituent. Preferably, the aluminum content of the coating is greater than 50%. The term flat steel products is typically used for describing steel sheets or steel strips together.

Moreover, the teaching of the invention includes a method for producing a flat steel product comprising an aluminum-based coating having 1.8 to 15 mass percent silicon, advantageously 5 to 13 mass percent silicon, even more advantageously 8 to 11 mass percent silicon, wherein as a coating the aluminum-based coat is applied to the flat steel product in the hot-dipping method and wherein, after the hot-dipping process, the flat steel product with the coat is subjected to an erosive surface treatment, in which, starting from the surface of the coating, predominantly or preferably aluminum is partially removed chemically or electrochemically from the coating in order to increase the percentage proportion of silicon in comparison with the proportion of aluminum in the surface of the coat.

In the case of this structure of the coating, it is apparent that the surface of the coating is the surface of the coat. The method is particularly suitable for producing press-form-hardened components, wherein the flat steel product coated in this manner is subjected to an austenitizing annealing treatment prior to the press-form-hardening. The erosive surface treatment takes place prior to an austenitizing annealing treatment and press-form-hardening of the flat steel product in accordance with the invention.

The teaching of the invention also includes a method for producing press-hardened components consisting of flat steel products comprising an aluminum-based coating which is treated in accordance with the invention, wherein the flat steel products are heated at least in sections to a temperature above austenitization temperature Ac3, are subsequently formed at this temperature and cooled at a rate which at least in sections, preferably overall, is above the critical cooling rate for martensite formation.

Furthermore, the invention comprises a press-hardened component consisting of the inventive flat steel products provided with an aluminum-based coating containing 1.8 to 15 mass percent silicon, produced according to the previously described method. Advantageously, 5 to 13 mass percent, even more advantageously 8 to 11 mass percent silicon is present in the aluminum-based coating. The numbers given in mass percent relate to the coat of the flat steel product prior to further processing, in particular prior to heating and press-hardening.

Silicon is required in order to avoid the formation of a thick and brittle intermetallic $Fe_2Al_5$ phase between the steel and coat during the hot-dip coating procedure. Instead, when the contents of silicon indicated above are added as an intermetallic phase, a thinner ternary Fe—Si—Al layer is formed as an intermetallic phase which has better formability.

Aluminum-based coats are understood hereinafter to be metallic coats, in which aluminum is the main constituent in mass percent. Examples of possible aluminum-based coats are aluminum-silicon (AS), aluminum-zinc-silicon, as well as the same coats with admixtures of individual or a plurality of additional elements, such as e.g. Mg, Mn, Ti, Pb, Ni, Zr, Hf, Ce, La, not exceeding 30 wt. % in total.

Not pre-alloyed and not thoroughly alloyed means that the ternary intermetallic Fe—Al—Si phase between the steel and coat formed as a result of the hot-dipping process is still present and the iron content in the coat (without taking into consideration the ternary intermetallic Fe—Al—Si phase between the steel and coat) is below 5 mass percent, advantageously under 4 mass percent.

Figure 1:
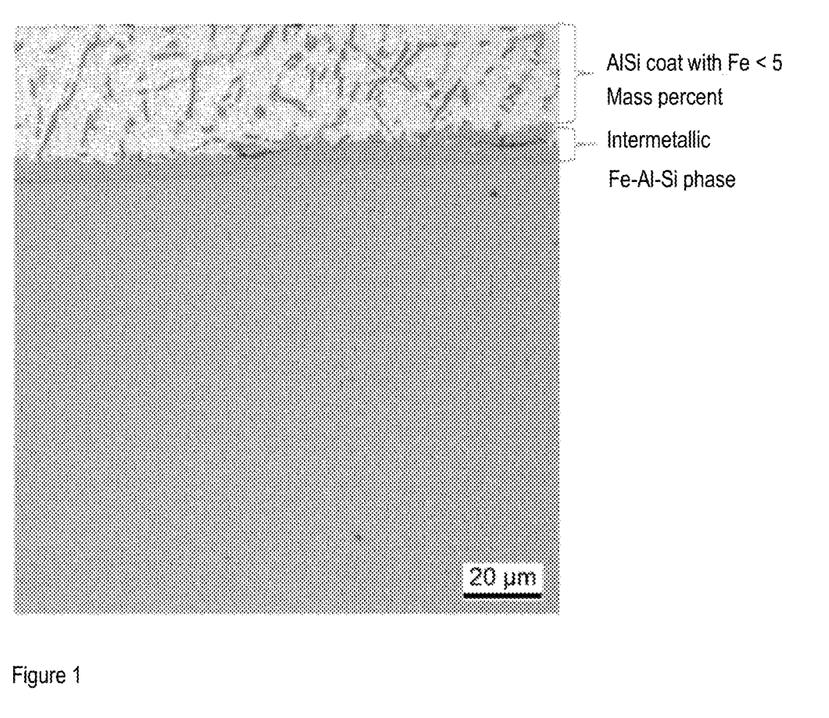
FIG. 1 shows an exemplary AlSi coating prior to the actual heat treatment in order to illustrate the regions described herein.

FIG. 1 shows by way of example an AlSi coating prior to the actual heat treatment in order to illustrate the regions described here.

It has also been recognised that the surface of the coat, at a reference temperature corresponding to the average furnace temperature during the annealing treatment, should have a degree of absorption for thermal radiation between 0.35 and 0.95 in order to achieve considerably increased heating rates. In an advantageous manner, the degree of absorption is between 0.40 to 0.80, in a particularly advantageous manner it is between 0.45 to 0.70.

With the aid of reflection measurements over a large spectral range, it is possible to calculate the corresponding absorption spectra for determining the degree of absorption for the room temperature or the average furnace temperature.

Radiation which impinges upon a body is partially reflected, partially transmitted or is absorbed by the body. Therefore, for reflection $\rho$, transmission $\tau$ and absorption $\alpha$, the following general relation applies:

$$\rho+\tau+\alpha=1$$

For non-transparent bodies, $\tau=0$ and therefore the following applies for absorption:

$$\alpha=1-\rho$$

With the aid of reflection measurements over a large spectral range, the corresponding absorption spectra can be calculated. The total degree of absorption α(T) at the reference temperature T is then evaluated by the following formula:

$$\alpha(T) = \frac{\int_{\lambda_1}^{\lambda_2} \alpha_\lambda \cdot i_\lambda(T) d\lambda}{\int_{\lambda_1}^{\lambda_2} i_\lambda(T) d\lambda}$$

The spectral radiation power $i_\lambda(T)$ of the black body radiator at a wavelength of λ and the reference temperature T can be calculated according to Planck with Planck's constant h, the speed of light c and the Boltzmann constant k:

$$i_\lambda(T) = \frac{2\pi h c^2}{\lambda^5 \left(e^{\frac{hc}{\lambda k T}} - 1\right)}$$

The delivery state of the sheet surface prior to the austenitizing annealing treatment and prior to the press-hardening was determined at room temperature by means of reflection measurements. Room temperature is understood to be a temperature range of 18 to 24° C., in particular a temperature of 20° C. For this purpose, a UV-Vis spectrometer was used for measurements in the range of 250-2500 nm and an infrared spectrometer was used for measurements in the range of 2.5-25 μm. Integrating spheres, so-called Ulbricht spheres, were used for the measurements. In the range between 4170 and 4470 nm, the spectra were corrected in order to compensate for the $CO_2$ absorption from the air. Absorption spectra were calculated from the reflection spectra. In the case of a degree of absorption related to room temperature, room temperature is assumed to be the reference temperature T and using this temperature the total degree of absorption α(T) is calculated by the aforementioned formulae. In the case of a degree of absorption related to an average furnace temperature during the austenitizing annealing treatment, this temperature is used as the reference temperature T for calculating the total degree of absorption α(T). Degrees of absorption for different reference temperatures cannot be converted into one another because they are linked to one another by the absorption spectrum. For this reason, different value ranges are claimed for the degree of absorption related to room temperature, and for the degree of absorption related to an average furnace temperature during the austenitizing annealing treatment.

Inventive degrees of absorption of the coating surface result in higher heating rates in the furnace and thus in a reduction in the minimum required furnace dwell time. The process window is shifted merely by the period of time saved during the heating procedure and therefore no reduction in the size of the process window takes place because the coat is not pre-alloyed with iron. In tests to ascertain the heating rates in the temperature range of room temperature to 900° C., an increase in the heating rates of up to 86% was ascertained depending upon the degree of absorption of the surface.

Therefore, the processor is provided with a steel strip or steel sheet for the press-form-hardening procedure, which has considerable advantages as a result of short furnace dwell times, without having to accept the disadvantages of the known partial or complete pre-alloying of the coat with iron.

In accordance with the invention, for this purpose the steel sheet or steel strip comprising the coat is subjected, after the hot-dipping process and prior to the process of press-form-hardening, to an erosive surface treatment, in which, starting from the surface of the coat, aluminum is at least partially removed chemically or electrochemically from the coat in order to increase the percentage proportion of silicon in comparison with the proportion of aluminum in the surface of the coat.

In the tests, it has surprisingly been found that by means of near-surface, selective removal of preferably or predominantly aluminum from the coat, the silicon phase or silicon-rich phase contained in the coat remains, whereby a considerable increase in the degree of absorption of the thermal radiation in the furnace is achieved and results in a considerably higher heating rate during the heating procedure.

Advantageously, it has also been found that the near-surface silicon phases or silicon-rich phases which remained after the erosive surface treatment do not also fuse during heating in the roller hearth furnace when the eutectic temperature of the AlSi coat is reached and exceeded. As a result, the reaction between the molten phase and the ceramic furnace rollers for transporting the plates is reduced, which considerably increases the service life of the rollers in the furnace and can lead to a reduction in maintenance costs.

For the coating or the coat after the erosive surface treatment, it remains the case that the coating or the coat is aluminum-based.

It has proven to be particularly advantageous if, after the erosive surface treatment the coat, starting from the surface of the coating and typically perpendicular as seen in the thickness direction of the coating, has within the first 0.05 μm an average silicon content between 25 and 70 mass percent, advantageously between 30 and 60 mass percent and particularly advantageously between 35 and 55 mass percent. In this case, e.g. GDOES can be used as a suitable method for measuring the average Si content, if a suitable pre-coating is vapour-deposited on the sample surface, which is to be measured, prior to the analysis. This pre-coating serves on the one hand, in the time period until a stable and uniform material removal takes place, to remove only the pre-coating, and serves on the other hand to fill the gaps between the protruding Si phases in order to permit uniform removal. The element for the pre-coating is to be selected such that it can be easily extracted during the processing of the GDOES raw data. In dedicated tests, a thin gold coating proved to be expedient. The removal time (sputtering time) used for depth information must be adapted such that the time period in which exclusively gold is removed remains out of consideration.

In accordance with the invention, in an advantageous manner an aqueous medium which contains alkali metal hydroxides or alkali carbonates, such as e.g. sodium hydroxide, potassium hydroxide or sodium carbonate, in concentrations of typically 0.5 to 30 mass percent, is used as the removal means for chemical treatment. It is favourable to maintain a pH value of >10, advantageously >11 and particularly advantageously >12. In one advantageous development, the aqueous medium can additionally contain up 10 mass percent fluorides (e.g. sodium fluoride), up to 2 mass percent surfactants for removing organic impurities and/or wetting agents for improving the wettability.

Electrochemical removal methods use not only alkali but also neutral and acid, aqueous electrolyte media which exceed an electrolytic conductivity of 100 mS/m. The removal in accordance with the invention is effected anodically. Conducting salts can be added to the electrolyte medium in order to increase conductivity. Furthermore, the electrolyte medium can contain complexing agents (e.g. fluoride, ethylenediaminetetraacetic acid, polycarboxylates, citrates, gluconates) in order to stabilise the electrolyte. The electrochemical removal treatment can be performed both in a potential-controlled manner and under galvanostatic conditions.

In tests, it has also been recognised that the degree of absorption of the surface and therefore the heating rate in the furnace are dependent upon the material removal during the erosive surface treatment. In a particularly reliable manner, the required degree of absorption of the surface for the thermal radiation absorbed during the heating procedure in the furnace is achieved if, during the erosive surface treatment, a mass loss of the coat per sheet side or strip side of the flat steel product of 0.2 to 20 g/m$^2$, advantageously 0.5 to 10 g/m$^2$, particularly advantageously 1.0 to 5 g/m$^2$ is sought.

In a particular embodiment, the chemical surface treatment can be performed in a dipping or injection method.

The method in accordance with the invention is particularly economically viable if the erosive surface treatment is effected continuously in a hot-dipping coating installation following the hot-dipping procedure.

In a further advantageous development of the invention, provision is made that, following the erosive surface treatment, electrochemical anodising, plasma oxidation or plasma-electrolytic oxidation of the surface of the coat is effected, wherein an oxidic cover layer is formed on the surface of the coat subjected previously to removal treatment.

By forming a defined cover layer containing aluminum oxide and/or aluminum hydroxide, the aforementioned positive aspects of the removal treatment of the surface of aluminum-based coatings can be improved once again. Advantageously, the average layer thickness of the cover layer is less than 1 µm and greater than 0.05 µm, advantageously less than 0.8 µm and greater than 0.1 µm. The cover layer should have mass proportions of aluminum oxide and/or aluminum hydroxide of at least 50%, advantageously more than 70%. With this structure of the coating, it is apparent that the surface of the coating is the surface of the cover layer, for which the degrees of absorption in accordance with the invention apply.

The inventive, additional electrolytic anodising of the surface of the coat is effected advantageously in a medium on the basis of boric acid, citric acid, sulphuric acid, oxalic acid, chromic acid, alkyl sulphonic acids, carboxylic acids, alkali carbonates, alkali phosphates, phosphoric acid or hydrofluoric acid.

In one advantageous embodiment of the invention, the cover layer is applied onto the surface of the coat likewise in a continuous process following the erosive surface treatment.

In an advantageous manner, the cover layer additionally applied on the surface of the coat, which is subjected to removal treatment in accordance with the invention, additionally separates the metallic aluminum-based coat of the steel strip from the ceramic roller surface in the roller hearth furnace. The cover layer does not fuse during the heating of the plates and so a reaction between the coat and furnace roller is effectively prevented.

In summary, as a result of the invention, the following is to be noted: whereas previously e.g. for sheet thicknesses of 1.5 mm, annealing times in the roller hearth furnace of e.g. 4 minutes at 950° C. furnace temperature were required for thorough alloying of the coating with iron and forming a surface topography capable of being lacquered, in the method in accordance with the invention for a sheet thickness of 1.5 mm annealing times of e.g. 3 minutes or less are required (depending upon the intensity of the removal treatment), the annealing time is thus significantly reduced. The maximum possible furnace times change by reason of the surface of the coat subjected to removal treatment or the additionally applied cover layer only insofar as the process window is shifted towards shorter times without, however, becoming smaller. Alternatively, the first furnace zones in a roller hearth furnace can be operated with a significantly lowered temperature and so the same furnace passage time, heating rate and cycle time as in the case of untreated material are achieved using high temperatures for the first furnace zones. A further possibility is that of increasing the spaced interval between the plates in the furnace and for said plates to pass through the furnace at an increased transport speed but at the same cycle rate. As a result, when the installation is at a standstill it would be possible to reduce the amount of scrap by about 25% in the example used here.

For thicker sheets or lower furnace temperatures, the furnace time is extended accordingly.

The invention will be described in more detail hereinafter with the aid of the appended figures.

DETAILED DESCRIPTION OF THE PREFERRED EMBODIMENTS

Table 1 shows the ascertained degrees of absorption at room temperature and for different reference temperatures ($T_{ref}$) in the furnace for examples of surface treatments by means of a dipping method with a variation in the treatment temperature and the treatment time. Also illustrated are the effects on the removal of material (sum of top side and bottom side), the heating rate in the furnace and the average Si content on the surface of the coat.

annealing furnace, the temperature of which was 950° C. The heating rates were determined as average values until the target temperature, in this case e.g. 900° C., was reached.

TABLE 1

| Aqueous treatment medium | Temperature/ °C. | Time/ s | pH | Removal/ g/m² | $\emptyset$ Heating rate (22-900) °C./K/s | Average Si content (0-0.05 µm)/ Mass % | Degree of absorption ($T_{ref}$) | | | | In accordance with the invention |
|---|---|---|---|---|---|---|---|---|---|---|---|
| | | | | | | | 22 °C. | 900 °C. | 950 °C. | 1000 °C. | |
| Untreated | — | — | — | — | 6.0 | 19.4 | 0.05 | 0.22 | 0.23 | 0.23 | No |
| NaOH (100 g/l) | 40 | 10 | 13 | 1.8 | 7.9 | 33.1 | 0.09 | 0.37 | 0.38 | 0.39 | Yes |
| | 40 | 30 | 13 | 5.3 | 9.1 | 28.7 | 0.23 | 0.46 | 0.46 | 0.46 | Yes |
| | 70 | 10 | 13 | 13.2 | 9.8 | 25.1 | 0.31 | 0.48 | 0.48 | 0.48 | Yes |
| | 70 | 30 | 13 | 44.0 | 11.3 | 40.4 | 0.27 | 0.50 | 0.50 | 0.50 | Yes |
| NaOH (200 g/l) | 40 | 10 | 14 | 3.6 | 8.6 | 28.9 | 0.16 | 0.44 | 0.44 | 0.44 | Yes |
| | 40 | 30 | 14 | 9.6 | 9.4 | 22.2 | 0.31 | 0.47 | 0.47 | 0.46 | Yes |
| | 24 | 10 | 14 | 0.9 | 6.9 | 31.9 | 0.06 | 0.29 | 0.29 | 0.30 | No |
| | 24 | 30 | 14 | 2.6 | 8.6 | 28.0 | 0.12 | 0.42 | 0.42 | 0.42 | Yes |
| NaOH (25 g/l) | 45 | 10 | 13 | 2.0 | 8.4 | 30.5 | 0.09 | 0.38 | 0.39 | 0.39 | Yes |
| NaOH (150 g/l) | 24 | 30 | 14 | 2.0 | 7.7 | 29.4 | 0.08 | 0.36 | 0.37 | 0.37 | Yes |
| NaOH (5 g/l) + Chemetall Gardobond H7390 (4 g/l) | 70 | 10 | 13 | 1.3 | 6.7 | 34.0 | 0.07 | 0.35 | 0.36 | 0.37 | Yes |
| | 70 | 30 | 13 | 4.4 | 8.4 | 28.4 | 0.23 | 0.46 | 0.46 | 0.46 | Yes |

Figure 2:
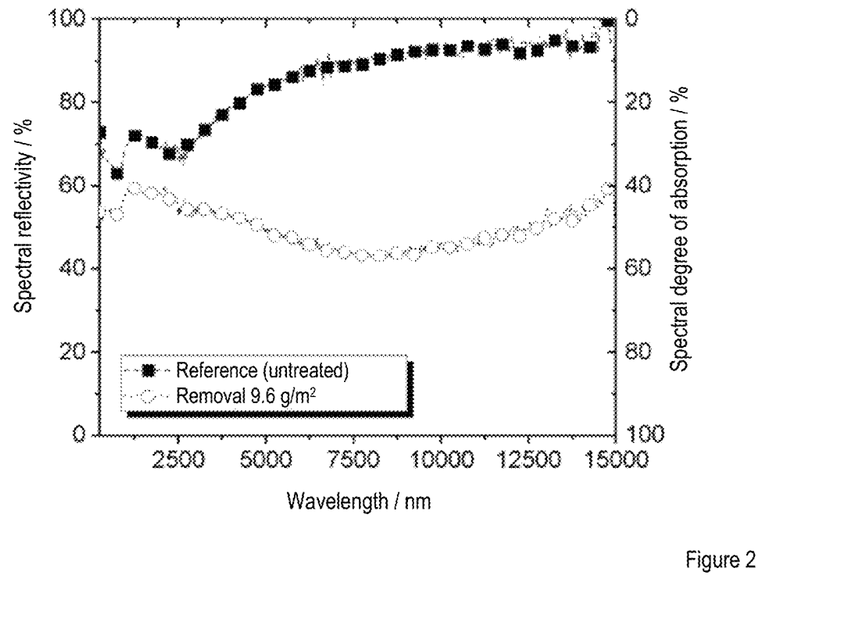
FIG. 2 shows an example of a reflection or absorption spectrum of an AS-coated surface of a steel sheet with removal of material on both sides in comparison with an untreated reference sample.

FIG. 2 shows an example of a reflection or absorption spectrum of an AS-coated surface of a steel sheet with removal of material on both sides (sum of top side and bottom side) of 9.6 g/m² in comparison with an untreated reference sample. The higher absorption of the surface, which is treated in accordance with the invention, over the illustrated spectral range of 250 nm to 15 µm is very clearly apparent.

Figure 3:
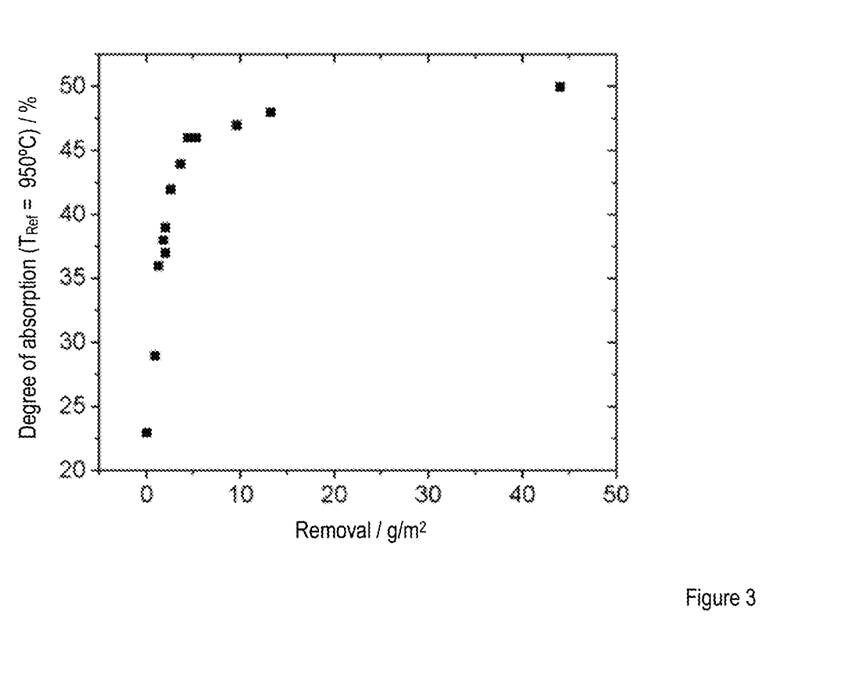
FIG. 3 illustrates the dependence of the total degree of absorption upon the removal of material on both sides at a reference temperature with the greater the removal of material, the greater the degree of absorption.

The dependence of the total degree of absorption upon the removal of material on both sides at a reference temperature of 950° C. is illustrated in FIG. 3. The greater the removal of material, the greater the degree of absorption.

Figure 4:
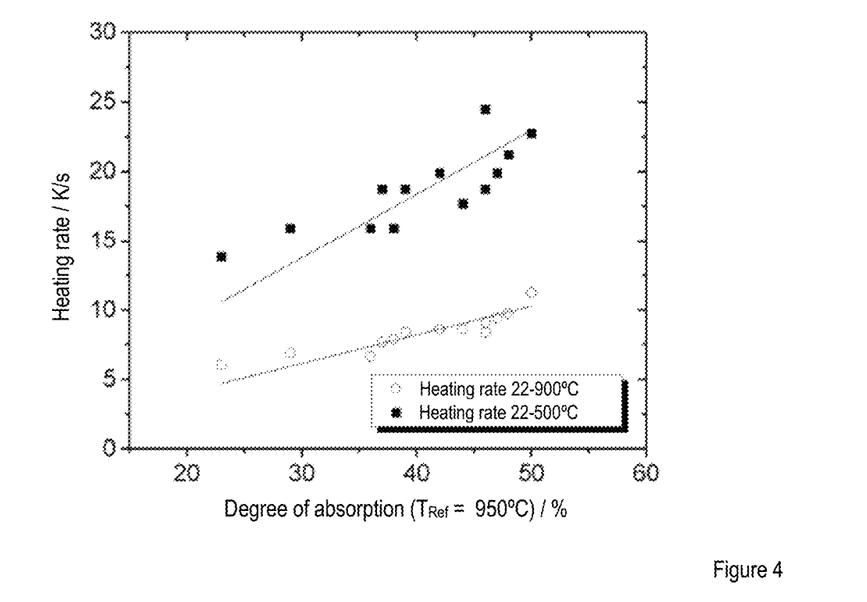
FIG. 4 illustrates linear correlations when the heating rate is correlated with different total degrees of absorption in the case of the furnace temperature as the reference temperature.

If the heating rate is correlated with different total degrees of absorption in the case of the furnace temperature as the reference temperature, then linear correlations are produced, as illustrated in FIG. 4. In this case, the average heating rates for reaching 500° C. and 900° C. in an annealing furnace at an average furnace temperature of 950° C. were shown. The greater scatter of the measurement points in the temperature interval 22-500° C. is produced from a scanning rate, which is comparatively low at 3 s per measurement point, during the recording of the heating curves.

The tests have shown that the degree of absorption at a reference temperature corresponding to the annealing temperature in the range of 880 to 950° C. during the hot forming should be advantageously between 0.35 and 0.95, advantageously between 0.40 and 0.80, particularly advantageously between 0.45 and 0.70.

The surface treatments were performed on AS-coated sample material by dipping in aqueous media. After the treatment, the samples were rinsed with fully desalinated water and dried with hot air. The removal of material is indicated as a sum of the top side and bottom side and was determined by differential weighing before/after the treatment.

In order to determine the heating rate, samples were contacted with a thermocouple and transferred into an annealing furnace, the temperature of which was 950° C. The heating rates were determined as average values until the target temperature, in this case e.g. 900° C., was reached.

The heating rates represent a system property which is dependent e.g. upon the sheet thickness, contact surfaces, furnace type and the set furnace zone temperatures. Therefore, the absolute values can be compared with one another only in a series of tests. In contrast, values, such as the average silicon content in the near-surface region of the coating or the degree of absorption of the surface represent material properties.

Figure 5:
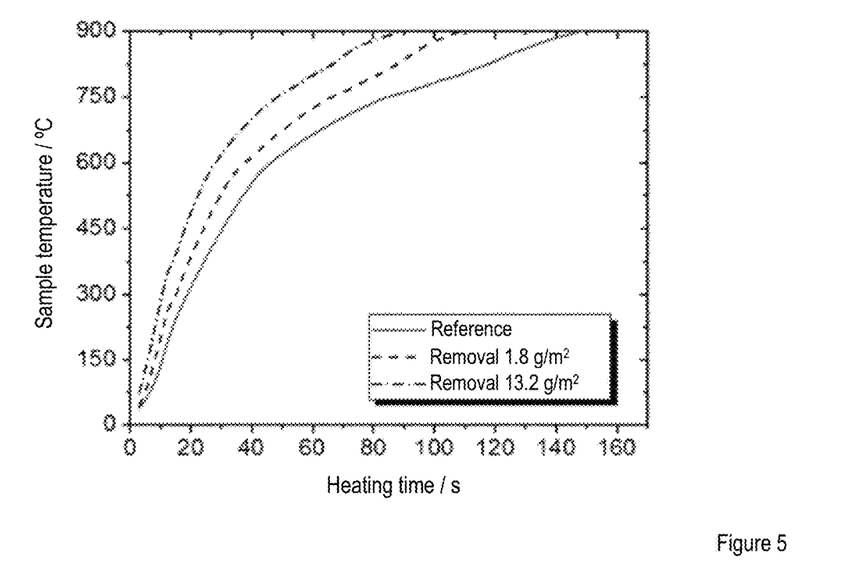
FIG. 5 shows three examples of heating curves until 900° C. is reached.

FIG. 5 shows three examples of heating curves until 900° C. is reached.

The average silicon contents at a depth in the range of 0-0.05 µm starting from the surface of the coat were determined from GDOES measurements. In order to permit a surface-sensitive measurement, the samples were cleaned beforehand with an organic solvent in an ultrasonic bath and were then metallised with a thin gold layer (ca. 10 to 50 nm). In order to ascertain the average silicon content of the material prior to the press-hardening from the GDOES measurements, the silicon signal in the range of 0 to 0.05 µm was integrated and this value was divided by 0.05 µm.

Figure 6:
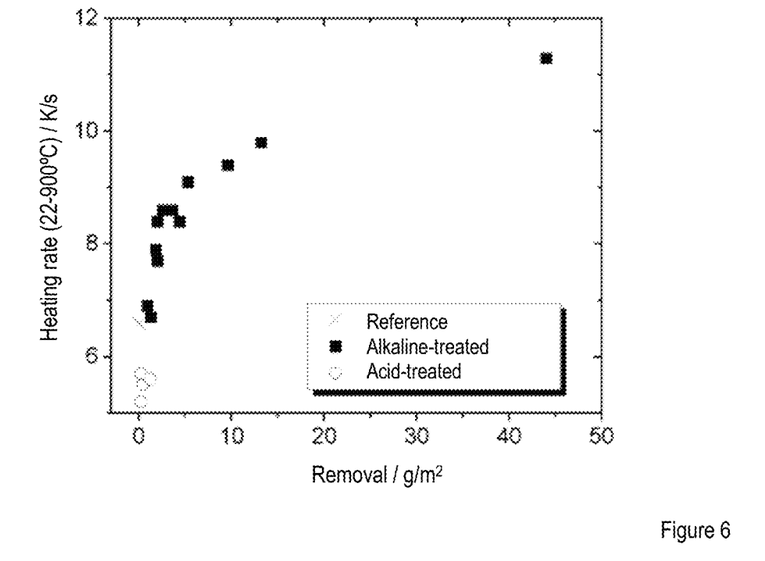
FIG. 6 shows a correlation between the removal of material and the heating rate.

FIG. 6 shows that there is a clear correlation between the removal of material and the heating rate. The greater the removal of material, the greater the heating rate.

Figure 7:
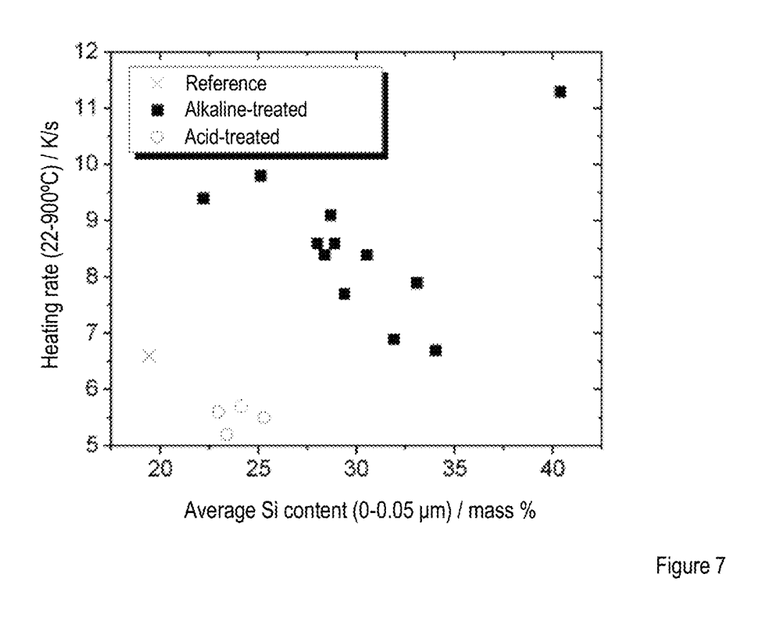
FIG. 7 shows the dependence of the average heating rate between 22 and 900° C. versus the average silicon content at a depth in the range of 0-0.05 µm starting from the surface of the coat.

FIG. 7 shows the dependence of the average heating rate between 22 and 900° C. versus the average silicon content at a depth in the range of 0-0.05 µm starting from the surface of the coat. The erosive surface treatment in accordance with the invention already leads to a significant increase in the heating rate when a small amount of material is removed.

Suitable media for the removal treatment which have proven to be advantageous are those with a pH>10, those with a pH>11 have proven to be more advantageous and those with a pH>12 have proven to be particularly advantageous. Depending upon the pH value, the degree of absorption of the surface can be adjusted by the temperature and concentration of the treatment medium and by the treatment duration.

In the case of the electrochemical surface treatment, it is basically possible to use the same removal means used for the purely chemical surface treatment. However, in this case not only alkali but also neutral and acid, aqueous electrolyte media which exceed an electrolytic conductivity of 100 mS/m are suitable.

First positive behaviour in relation to higher heating rates was found during removal of material of the coat for each sheet side or strip side of the flat steel product of 0.2 g/m². Greater removal of material results in higher heating rates. Removal quantities of above 20 g/m² do not provide any further advantages and are thus uneconomical. The advantageous range for the removal of mass of the coat for each sheet side or strip side of the flat steel product can thus be stated as 0.2 to 20 g/m², more advantageously 0.5 to 10 g/m², particularly advantageously as 1.0 to 5 g/m².

On the basis of the results, an optimum range for the average Si content starting from the surface of the coat in the region up to 0.05 μm is between 25 and 70 mass %, advantageously 30 and 60 mass %, particularly advantageously between 35 and 55 mass %.

Figure 8:
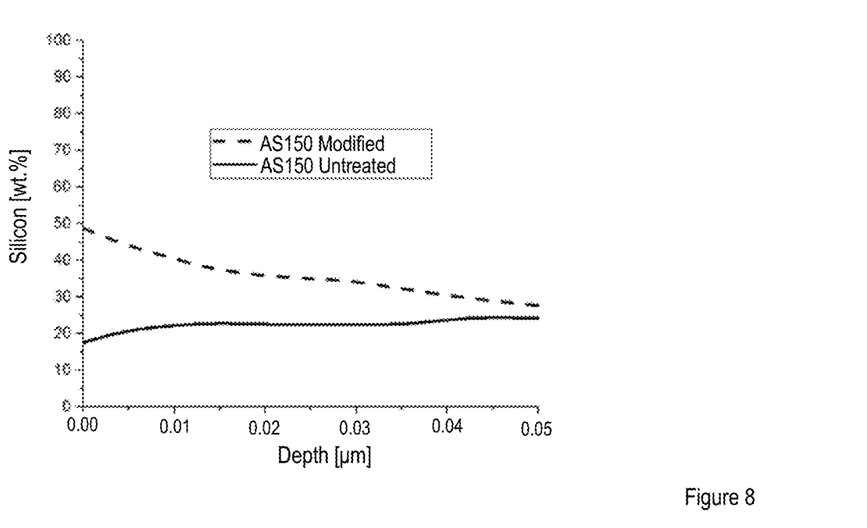
FIG. 8 illustrates GDOES analysis results for the silicon content in the first 0.05 µm starting from the surface of an AS150 coat.

FIG. 8 illustrates by way of example GDOES analysis results for the silicon content in the first 0.05 μm starting from the surface of an AS150 coat. In this case, the untreated AS150 surface has an average Si content in the region of 20 mass percent. In contrast, the AS150 surface modified in accordance with the invention has a considerably higher average content of Si of about 35 mass percent.

Figure 9:
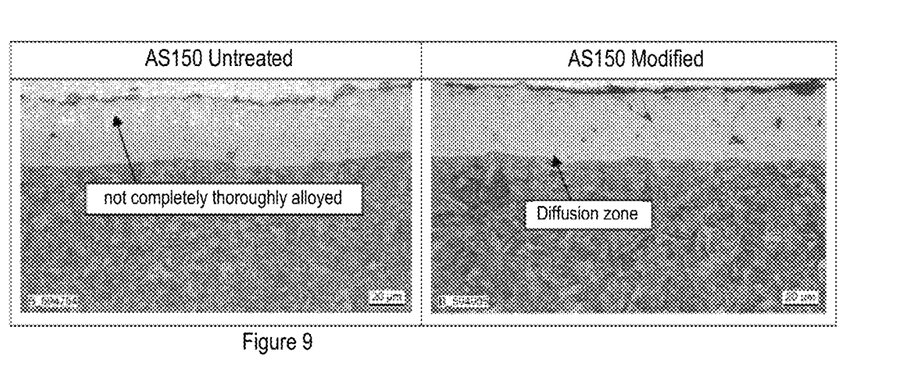
FIGS. 9 and 10 illustrate metallographic specimens of 22MnB5+AS150 plates that are untreated and are modified in accordance with the invention.
Figure 10:
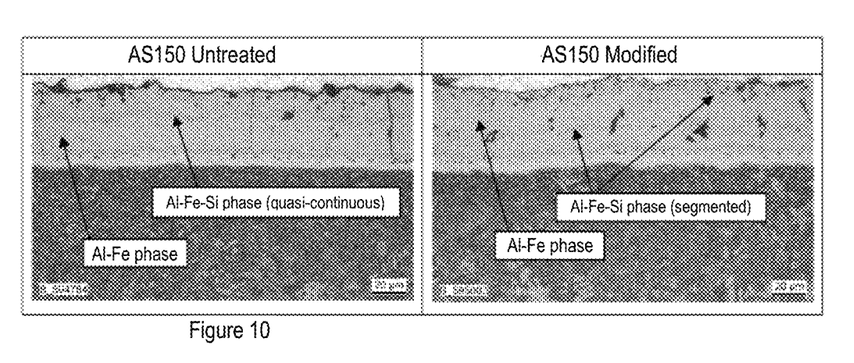

By way of example, FIGS. 9 and 10 illustrate, using light microscopy, metallographic specimens of 22MnB5+AS150 plates which are untreated and are modified in accordance with the invention and which have been heated at 910° C. furnace temperature and 180 seconds furnace time (FIG. 7) or 300 seconds furnace time (FIG. 8) and subsequently press-hardened. After 180 seconds furnace time, it is apparent that, in contrast to the plate modified in accordance with the invention, the untreated AlSi coat is still not thoroughly alloyed. After 300 seconds furnace time, it is apparent that the diffusion zone between the coat and steel in the 22MnB5+AS150 modified in accordance with the invention is considerably more thickly pronounced. Furthermore, as a result of the higher heating rate the intermetallic Al—Fe—Si phases have not formed as a predominantly continuous (quasi-continuous) layer extending in parallel with the steel surface, but instead have formed in a segmented manner.

The invention claimed is:

1. A flat steel product for a subsequent annealing treatment in an austenitizing manner in a furnace at a furnace temperature in the range of 880° C. to 950° C., the flat steel product comprising:
an aluminum-based coating, wherein the coating comprises an aluminum-based coat applied by hot-dipping and has 1.8 to 15 mass percent silicon, wherein the surface of the coating has a degree of absorption for thermal radiation between 0.35 and 0.95, and wherein the degree of absorption is related to the furnace temperature in the aforementioned range during the austenitizing annealing treatment.

2. The flat steel product as claimed in claim 1, wherein the degree of absorption is 0.40 to 0.80.

3. The flat steel product as claimed in claim 1, wherein an iron proportion in the coat is less than 5 mass percent.

4. The flat steel product as claimed in claim 1, wherein the coat additionally comprises admixtures of one or more of Zn, Mg, Mn, Ti, Pb, Ni, Zr, Hf, Ce, and La at a maximum of 30 mass percent in total.

5. The flat steel product as claimed in claim 1, wherein the coat has, starting from the surface within the first 0.05 μm, an average silicon content between 25 and 70 mass percent.

6. The flat steel product as claimed in claim 5, wherein the coat has, starting from the surface within the first 0.05 μm, an average silicon content between 30 and 60 mass percent.

7. The flat steel product as claimed in claim 1, further comprising a cover layer formed on the surface of the coat and wherein the cover layer has a mass proportion of aluminum oxide and/or aluminum hydroxide of at least 50%, said cover layer having been produced by electrochemical anodising, plasma oxidation or plasma-electrolytic oxidation.

8. The flat steel product as claimed in claim 7, wherein the average layer thickness of the cover layer is less than 1 μm and greater than 0.05 μm.

9. A method for producing a flat steel product for a subsequent annealing treatment in an austenitizing manner in a furnace at a furnace temperature in the range of 880° C. to 950° C., the flat steel product comprising an aluminum-based coating having 1.8 to 15 mass percent silicon, comprising:
applying as a coating an aluminum-based coat to the flat steel product in a hot-dipping process;
subjecting the flat steel product with the coat to an erosive surface treatment after the hot-dipping process, in which, starting from the surface of the coating, aluminum is at least partially removed chemically or electrochemically from the coating in order to increase the percentage proportion of silicon in comparison with the proportion of aluminum in the surface of the coat such that the surface of the coating has a degree of absorption for thermal radiation between 0.35 and 0.95, wherein the degree of absorption is related to the furnace temperature in the aforementioned range during the austenitizing annealing treatment.

10. The method as claimed in claim 9, wherein by reason of the erosive surface treatment in the coating starting from the surface of the coating within the first 0.05 μm an average silicon content is set between 25 and 70 mass percent.

11. The method as claimed in claim 9, wherein for the erosive surface treatment an aqueous medium containing alkali metal hydroxides or alkali carbonates is used to at least partially remove aluminum.

12. The method as claimed in claim 11, wherein the aqueous medium has a pH value >10.

13. The method as claimed in claim 11, wherein the aqueous medium contains fluorides.

14. The method as claimed in claim 11, wherein the aqueous medium contains surfactants and/or wetting agents.

15. The method as claimed in claim 11, wherein the erosive surface treatment is performed in a dipping or injection method.

16. The method as claimed in claim 9, wherein the erosive surface treatment is effected in a continuous process following the hot-dipping process.

17. The method as claimed in claim 9, wherein, during the erosive surface treatment, a mass loss of the coat of 0.2 to 20 g/m² is maintained for each side of the flat steel product on which the coat is applied.

18. The method as claimed in claim 17, wherein, during the erosive surface treatment, a mass loss of the coat of 1.0 to 5 g/m² is maintained for each side of the flat steel product on which the coat is applied.

19. The method as claimed in claim 9, further comprising producing an oxidic cover layer on the surface of the coat following the erosive surface treatment, wherein the oxidic cover layer is produced by electrochemical anodising, plasma oxidation or plasma-electrolytic oxidation of the surface of the coat.

20. The method as claimed in claim 19, wherein an average layer thickness of the cover layer of less than 1 μm and greater than 0.05 μm is produced.

21. Using a flat steel product according to claim 1 for producing press-hardened components,
  wherein the flat steel product is heated at least in sections to a temperature above austenitization temperature Ac3; and
  wherein the heated sections are subsequently formed and cooled at a rate which is above the critical cooling rate for martensite formation.

\* \* \* \* \*